US 6,192,469 B1

(12) United States Patent
Smalley et al.

(10) Patent No.: US 6,192,469 B1
(45) Date of Patent: Feb. 20, 2001

(54) RELOCATABLE CODE STORAGE IN AN INTEGRATED CIRCUIT WITH AN EMBEDDED MICROPROCESSOR

(75) Inventors: Kenneth George Smalley, Hauppauge; Ian Fraser Harris, Kings Park, both of NY (US)

(73) Assignee: Standard Microsystems Corporation, Hauppauge, NY (US)

( * ) Notice: Under 35 U.S.C. 154(b), the term of this patent shall be extended for 0 days.

(21) Appl. No.: 08/714,952

(22) Filed: Sep. 17, 1996

(51) Int. Cl.$^7$ .................................................. G06F 9/24
(52) U.S. Cl. .................................................. 713/1; 713/100
(58) Field of Search ..................................... 395/651, 652, 395/653; 713/1, 2, 100

(56) References Cited

U.S. PATENT DOCUMENTS

| 5,426,769 | * | 6/1995 | Pawloski ................................... 710/1 |
| 5,522,076 | * | 5/1996 | Dewa et al. ............................ 395/652 |
| 5,724,534 | * | 3/1998 | Boursier et al. ....................... 395/385 |
| 5,734,822 | * | 3/1998 | Houha et al. ........................ 395/200.6 |
| 5,848,281 | * | 12/1998 | Smalley et al. ....................... 713/322 |

OTHER PUBLICATIONS

Osborne et al., Osborne 4 & 8–Bit Microprocessor Handbook, Osborne/McGraw–Hill, 1981, pp. 6–1 through 6–18.*

* cited by examiner

Primary Examiner—Dennis M. Butler
(74) Attorney, Agent, or Firm—Proskauer Rose LLP

(57) ABSTRACT

A method and apparatus for providing relocatable code storage in a multifunction controller or other integrated circuit which includes an embedded microprocessor and an internal memory. The relocatable code is initially stored in an external memory which is shared by the embedded microprocessor and other system processing elements such as a host CPU. During a system initialization, power-on reset or other predetermined event, a memory multiplexing circuit connects the address inputs of the internal memory to a read/write address bus, and connects the output of a jump data storage circuit to a code data output bus. The jump data storage circuit uses code addresses received from the embedded microprocessor to generate a jump instruction code which is supplied to the embedded microprocessor via the code data output bus. The embedded microprocessor is thereby forced to jump to a designated location in external memory which may include a transfer instruction directing the embedded microprocessor to transfer relocatable code from the external memory to the internal memory. The memory multiplexing circuit then configures the internal memory into an execution mode, in which the address inputs of the internal memory are connected to a code address bus and the data outputs of the internal memory are connected to the code data output bus. This ensures that the embedded microprocessor will have access to valid internal code after a system initialization or other predetermined event.

17 Claims, 4 Drawing Sheets

RELOCATABLE CODE STORAGE IN AN INTEGRATED CIRCUIT WITH AN EMBEDDED MICROPROCESSOR

FIELD OF THE INVENTION

The present invention relates generally to code storage and execution in a microprocessor-based integrated circuit such as a multifunction controller. More particularly, the invention relates to techniques for providing relocatable code storage to thereby permit an embedded microprocessor in a microprocessor-based integrated circuit to operate reliably and efficiently with code stored in either an internal or an external memory.

BACKGROUND OF THE INVENTION

Application-specific integrated circuits (ASICs) often include components such as an embedded microprocessor and an internal random access memory (RAM). Multifunction controllers are one type of ASIC commonly used to provide functions such as input/output control and power management in computers and other electronic systems. A typical multifunction controller may utilize an embedded microprocessor and internal RAM to direct the operation of several independent input/output device controllers such as a floppy disk controller, one or more serial port controllers, a parallel port controller, and a keyboard/mouse interface controller. The embedded microprocessor provides power management functions for the system in which the multifunction controller is installed by monitoring the activity of the keyboard, mouse and other system elements using well-known interrupt processing techniques. The embedded microprocessor can shut down a main system power supply if no activity is detected for a predetermined time period, thereby placing the system in a standby or "sleep" mode of operation. A standby power supply is typically provided to supply power to the embedded microprocessor and other standby logic circuitry so that the system can be directed to exit sleep mode in response to a wake-up event such as a keyboard entry or mouse click.

The above-described multifunction controller generally requires some amount of internal code storage so that shutting down the main system supply does not completely prevent the embedded microprocessor from executing code. This internal code storage may be implemented in the form of read-only memory (ROM), which generally provides more code storage capacity for a given amount of chip area than other available memory types. However, a ROM-based code storage implementation usually requires that the code be programmed into memory at the time of chip fabrication, and it is relatively difficult to update or otherwise modify the code at a later date. An internal code storage technique which avoids these modification difficulties involves storing the code in the internal RAM of the multifunction controller. The stored code can then be updated or otherwise modified at any time. In such an implementation, chip area limitations often dictate that the minimum required amount of RAM be included within the multifunction controller, while the balance of the code storage is provided by an external memory device. The external memory device could be any type of memory device, including a non-volatile memory device such as a flash EPROM.

The external memory device may be shared by the embedded microprocessor and other system elements such as a host central processing unit (CPU). The code stored in the external memory device may therefore be unavailable to the embedded microprocessor when the host CPU is accessing the external memory device. In order to continue operating when the externally-stored code is unavailable, the embedded microprocessor must be able to execute code stored in the internal RAM. It is thus very important to ensure that the embedded microprocessor has adequate access to both internal and external code storage memory. Failure to provide adequate access can result in an undesirable interruption of the input/output control, power management and other functions of the embedded microprocessor. The problem of inadequate access to internal and external code storage may be particularly acute during certain phases of operation such as system initialization. For example, the external memory may include BIOS code or other code required by the host CPU soon after an initialization, and the internal code storage required by the embedded microprocessor may be dependent upon an initial loading of code from the external memory device. If the initial loading is prevented due to an inability to access the external memory device, the embedded microprocessor may be left with no internal code to execute. As noted previously, this can present a serious problem in the event of a main power supply shutdown. Unfortunately, prior art code storage techniques fail to provide adequate assurance that the host CPU or another system element will not prevent the embedded microprocessor from accessing the external memory device at or soon after a system initialization, as well as during other phases of system operation.

As is apparent from the above, there is a need for improved code storage techniques suitable for use in multifunction controllers as well as other microprocessor-based integrated circuits.

SUMMARY OF THE INVENTION

The present invention provides relocatable code storage techniques which permit an embedded microprocessor in a multifunction controller or other microprocessor-based integrated circuit to operate reliably and efficiently with both internally-stored and externally-stored code. The invention involves the automatic transfer of relocatable code from an external memory to an internal memory of the integrated circuit in response to a system initialization or other predetermined event. This ensures that the embedded microprocessor will have access to valid code in the internal memory after system initialization, and that the external memory can be shared with a host CPU or other processing system element without interfering with the interrupt processing, power management and other functions of the embedded microprocessor.

An exemplary embodiment of the invention includes a multifunction controller with an embedded microprocessor, an internal random access memory (RAM), and a RAM multiplexing circuit. The RAM multiplexing circuit includes address and data output multiplexers and is operative to place the internal RAM into either a read/write mode or a code execution mode in accordance with the status of a memory control bit. A set of relocatable code is initially stored in an external memory which is shared by the embedded microprocessor and other system processing elements such as a host CPU. In response to a system initialization, power-on reset or other predetermined event, the RAM multiplexing circuit automatically configures the internal memory into the read/write mode. This involves applying appropriate select signals to the address and data output multiplexers such that the address inputs of the internal memory are connected via the address multiplexer to a read/write address bus, and the output of a jump data storage circuit is connected via the data output multiplexer to a code data output bus. The jump data storage circuit uses code addresses received from a code address bus of the embedded microprocessor to generate a jump instruction code which is supplied to the code data output bus and thereby to the embedded microprocessor.

The jump instruction code forces the embedded microprocessor to jump to a designated location in external memory. The designated location in external memory may include a transfer instruction directing the embedded microprocessor to transfer the relocatable code from the external memory to the internal memory. Alternatively, the jump instruction may automatically initiate the transfer of code from the designated location or another specified location. After the relocatable code transfer is complete, the RAM multiplexing circuit configures the internal RAM into an execution mode. This involves applying appropriate select signals to the address and data output multiplexers such that the code address bus is connected via the address multiplexer to the address inputs of the internal RAM, and the data outputs of the internal RAM are connected via the data output multiplexer to the code data output bus. The embedded microprocessor can then execute the code stored in the internal RAM, or may utilize other code stored in the external memory.

DETAILED DESCRIPTION OF THE INVENTION

The present invention will be illustrated below in conjunction with an exemplary multifunction controller having an embedded microprocessor. It should be understood, however, that the relocatable code storage techniques of the present invention are more broadly applicable to a wide variety of other types of microprocessor-based integrated circuits, devices and systems. Exemplary applications for the code storage techniques described herein include, without limitation, integrated circuits for use in computers and control systems. In addition, it should be noted that the invention does not require the use of any particular type of microprocessor. The term "embedded microprocessor" as used herein is intended to include any type of processing circuit which may be configured to utilize the described relocatable code storage functions. The term "code" as used herein includes any type of instructions which may be executed by a processing circuit. Furthermore, although the invention will be illustrated below as including a code transfer from external to internal memory which occurs upon system initialization, the transfer could be provided in conjunction with other system events instead of or in addition to the system initialization. For example, the code transfer could be provided in response to a power-on reset or any other predetermined system event or operating condition.

Figure 1:
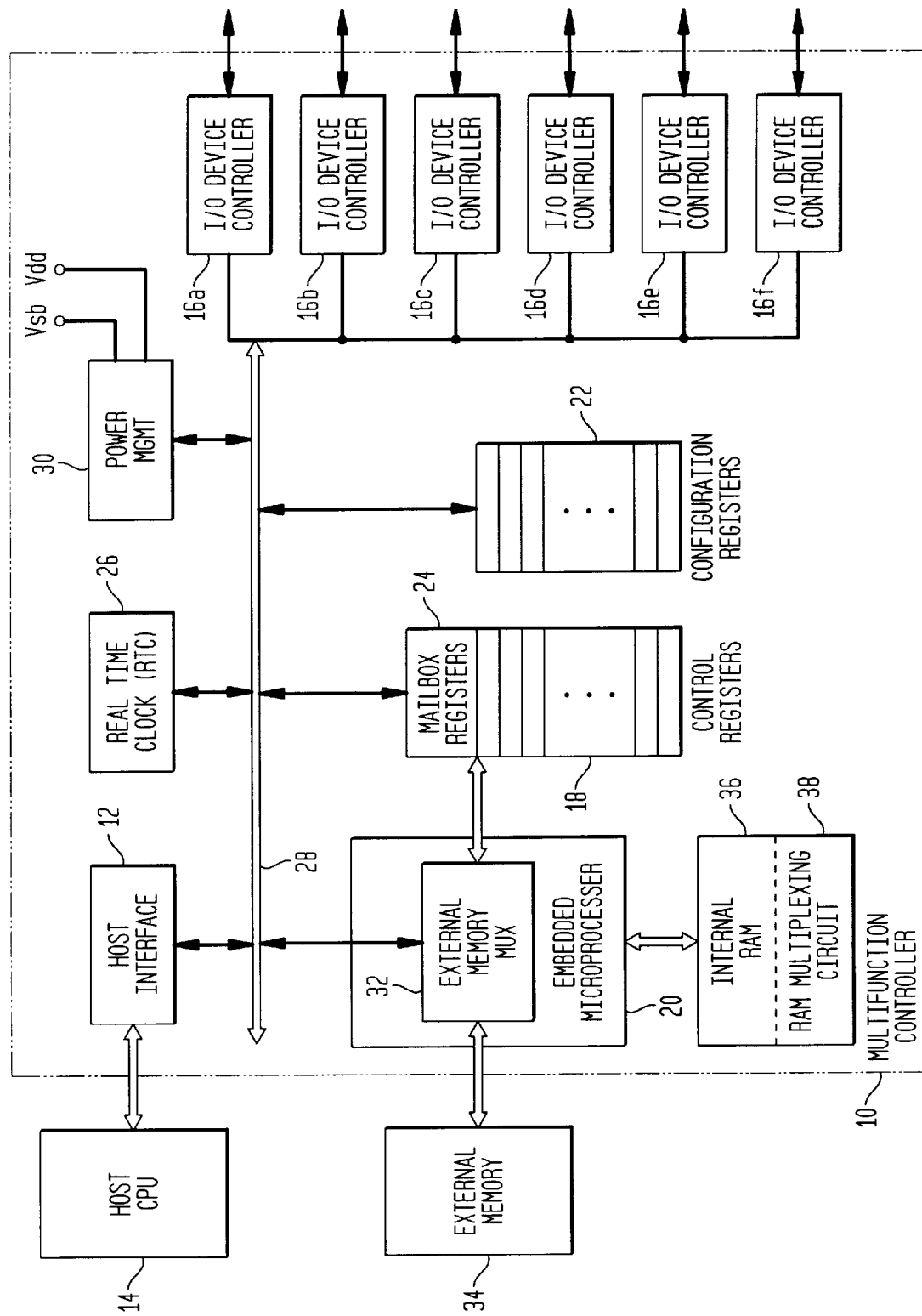
FIG. 1 is a block diagram illustrating an exemplary multifunction controller and its interface with an external host central processing unit (CPU) and an external memory.

FIG. 1 shows a block diagram of a multifunction controller 10 in which the relocatable code storage techniques of the present invention may be implemented. The multifunction controller 10 includes a host interface 12 for interfacing with a host central processing unit (CPU) 14 which is external to the multifunction controller 10. The multifunction controller 10 also includes a number of independent input/output (I/0) device controllers 16a–16f. These device controllers may include a floppy disk controller, a mouse interface controller, a keyboard interface controller, a parallel port controller and several serial port controllers. The operation of the device controllers 16a–16f may be directed in accordance with information stored in a set of control registers 18. One or more of the control registers 18 are associated with each device controller 16a–16f.

The multifunction controller 10 includes an embedded microprocessor 20 which may be an 8-bit microprocessor such as the 8051 available from Intel. The operation of the 8051 microprocessor is described in greater detail in the following Intel publications: "Embedded Microcontrollers and Processors," Vol. 1, 1993; "MCS-51 Family of MicroControllers, Architectural Overview," September 1989; and "MCS-51 Programmer's Guide and Instruction Set," July 1989. The remainder of the description will assume that the embedded microprocessor 20 is an 8051 microprocessor, although as noted above the present invention does not require the use of any particular type of microprocessor. The embedded microprocessor 20 directs the operation of the control registers 18, which in turn direct the operation of the I/O device controllers 16a–16f. The control registers 18 form at least part of the address space of the embedded microprocessor 20. This control register address space may be on the order of 64k bytes.

The multifunction controller 10 further includes a set of configuration registers 22. The configuration registers 22 are shown as a single unit in FIG. 1 for clarity of illustration. However, it should be noted that these configuration registers may represent different portions of one or more random access memory (RAM) devices, portions of data or program read-only memory (ROM), as well as various other registers associated with the embedded microprocessor 20. The address space represented by the configuration registers 22 may be on the order of 256 bytes. Also associated with the embedded microprocessor 20 is a set of mailbox registers 24. The mailbox registers 24 may be considered part of the control registers 18 as shown in the embodiment of FIG. 1 or may be arranged internal to the embedded microprocessor 20 in alternative embodiments. The mailbox registers 24 are typically utilized to enable the host CPU 14 to access the control registers 18. U.S. patent application Ser. No. 08/661, 128 of Steven Burstein, Ian F. Harris and Kenneth G. Smalley, entitled "Bridge Mode" and assigned to the assignee of the present invention, discloses a technique which allows the host CPU 14 to directly access the control registers 18 without intervention of the embedded microprocessor 20. The disclosure of this application is incorporated herein by reference.

Other elements of the multifunction controller 10 include a real time clock (RTC) 26, a bus structure 28 and a power management circuit 30. The RTC 26 generates calendar, time of day and other timing information for the multifunction controller 10. The bus structure 28 interconnects the host interface 12, control registers 18, embedded microprocessor 20, configuration registers 22, RTC 26 and power management circuit 30. The power management circuit 30 is coupled to a main system supply Vdd of the computer or other electronic system in which the multifunction controller 10 is installed. The power management circuit 30 is also connected to a standby power supply Vsb which may be a low-current power supply.

The power management circuit 30 controls application of the main power supply Vdd and the standby supply Vsb to the other elements of the controller 10 and the system in which it is installed. The power management circuit 30 operates to place portions of the multifunction controller 10 into a standby or "sleep" mode in response to certain system conditions, such as a lack of keyboard or mouse activity for a predetermined period of time. During sleep mode, power is conserved by turning off the main power supply Vdd or otherwise disconnecting Vdd from most current-consuming elements of the multifunction controller 10 and the corresponding system. The embedded microprocessor 20, the power management circuit 30, an internal RAM 36 and any I/O device controllers 16a–16f required to wake up the multifunction controller 10 and the corresponding system remain powered by the standby supply Vsb. The internal RAM 36 may store a number of interrupt vectors which are used by the embedded microprocessor 20 and power management circuit 30 to respond to wake-up events. Powering the internal RAM 36 from the standby supply Vsb ensures that the stored interrupt vectors will be available whenever the embedded microprocessor is executing code, regardless of the status of the main system supply.

These and various other aspects of power management are described in greater detail in U.S. patent application Ser. No. 08/685,378 of Kenneth G. Smalley and Ian F. Harris filed Jul. 23, 1996 and entitled "Method and Apparatus for Power Management in a Multifunction Controller with an Embedded Microprocessor," U.S. patent application Ser. No. 08/685,376 of Jay D. Popper and Richard E. Wahler filed Jul. 23, 1996 and entitled "Method and Apparatus for Power Supply Switching with Logic Integrity Protection," and U.S. patent application Ser. No. 08/541,642 of Jeffrey C. Dunnihoo filed Oct. 10, 1995 and entitled "Process and Apparatus for Generating Power Management Events in a Computer System," all of which are assigned to the present assignee and incorporated by reference herein.

The embedded microprocessor 20 in this exemplary embodiment includes an external memory multiplexer 32. The multiplexer 32 allows both the embedded microprocessor 20 and the host CPU 14 to share an external memory 34. As noted above, the external memory 34 may be a RAM, a flash EPROM or any other type of volatile or non-volatile memory. The external memory 34 provides additional code storage capacity for the multifunction controller 10 such that the amount of internal code storage memory and the corresponding chip area can be minimized. The host CPU 14 accesses the external memory 34 via host interface 12, bus structure 28 and multiplexer 32. A select signal applied to the multiplexer 32 determines which of the embedded microprocessor 20 or host CPU 14 is permitted to access the external memory at a given time. In alternative embodiments, the multiplexer 32 may be located external to the embedded microprocessor 20 or multifunction controller 10.

The internal RAM 36 of the multifunction controller 10 is coupled to the embedded microprocessor 20. The signals applied to and output from the internal RAM 36 are controlled by RAM multiplexing circuit 38 which will be described in greater detail in conjunction with FIG. 2 below. The internal RAM 36 provides internal code storage for the embedded microprocessor 20, and may be implemented as a 256 byte static RAM or any other suitable static or dynamic RAM. The RAM multiplexing circuit 38 ensures that the appropriate code may be transferred to the internal RAM 36 from the external memory 34 during a system initialization or other phase of system operation. The embedded microprocessor code can be updated or otherwise modified at any time by suitable alteration of the contents of internal RAM 36. The present invention overcomes the above-described problem of ensuring adequate access to externally-stored code by utilizing a forced jump instruction which automatically transfers code from the external memory 34 to the internal RAM 36 during a system initialization.

Figure 2:
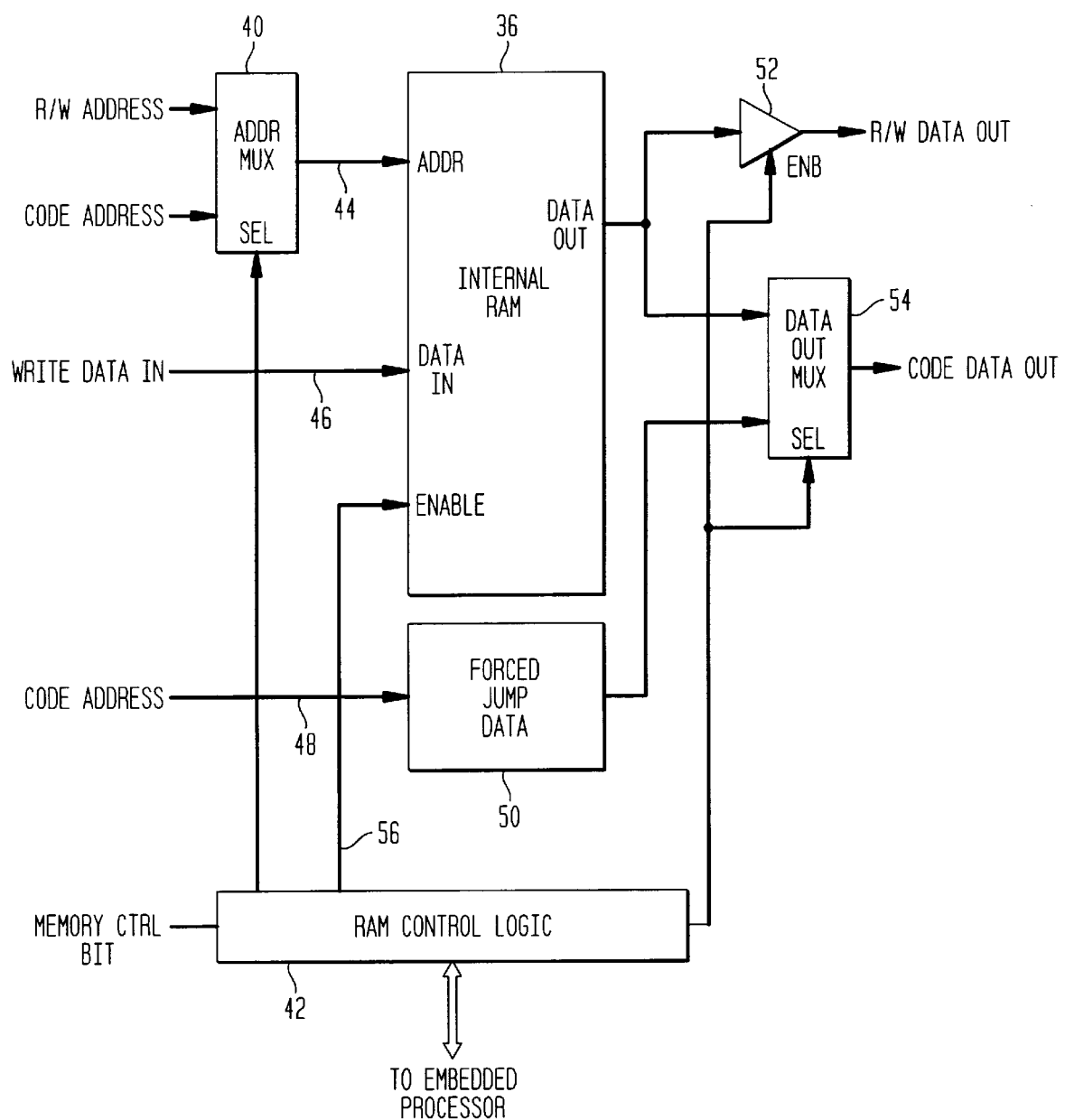
FIG. 2 is a more detailed block diagram showing the internal random access memory (RAM) and RAM multiplexing circuit of FIG. 1 in accordance with an exemplary embodiment of the present invention.

FIG. 2 shows the RAM multiplexing circuit 38 of FIG. 1 in greater detail. An address multiplexer 40 receives as inputs the read/write (R/W) address bus and the code execution address bus of the embedded microprocessor 20. The internal RAM 36 in this exemplary embodiment has a R/W mode and a code execution mode. The internal RAM 36 can be both read and written in the R/W mode but can only be read while in the code execution mode. As will be described in greater detail below, the R/W mode is automatically selected during a system initialization in order to effect the transfer of code from the external memory 34 to the internal RAM 36. A select signal input of the address multiplexer 40 receives an address select signal from a RAM control logic circuit 42. The value of the address select signal determines whether the address multiplexer 40 connects the R/W address bus or the code execution address bus of the embedded microprocessor 20 to the internal RAM 36 via address input line 44. Write data to be stored in the RAM 36 during a write operation is supplied from the embedded microprocessor 20 via a write data input bus 46. At least a portion of the code address is also supplied via line 48 to a forced jump data storage circuit 50 which stores a predetermined set of jump data. The stored jump data is identified by the value of certain bits of the code address and generally includes a forced jump instruction code which directs the embedded microprocessor 20 to jump to a specified location in the external memory 34. The execution of this forced jump instruction code initiates the transfer of code from external memory 34 to internal RAM 36.

A data output buffer 52 supplies the data output of the internal RAM 36 to a data bus of the embedded microprocessor 20 when enabled by an enable signal supplied from the RAM control logic circuit 42. The data output of the internal RAM 36 is also applied to one input of a data output multiplexer 54. The other input of the data output multiplexer 54 receives the forced jump data from the jump data storage circuit 50. As noted above, the jump data supplied to the data output multiplexer 54 is identified by the portion of the code address applied via line 48 to the jump data storage circuit 50. A data output select signal is applied to a select input of the data output multiplexer 54. The value of the data output select signal determines whether the forced jump data from jump data storage circuit 50 or the data output of the internal RAM 36 is applied to the code execution data bus of the embedded microprocessor 20.

The RAM control logic circuit 42 directs the selection of the above-noted R/W and code execution modes of operation in accordance with a memory control bit which may be stored in one of the control registers 18. The internal RAM 36 is placed in a R/W mode of operation when the memory control bit is a binary "0". As noted above, this R/W mode of operation is automatically entered upon a system initialization. During the R/W mode of operation, the RAM control logic circuit 42 provides an address select signal which causes address multiplexer 40 to connect the R/W address lines to the address input of the internal RAM 36.

The RAM control logic circuit 42 also provides an output select signal which causes the data output multiplexer 54 to connect the code data output lines to the forced jump data supplied from jump data storage circuit 50. This output select signal also serves to enable the R/W data output buffer 52. During the R/W mode, the addresses of internal RAM 36 are mapped into the embedded processor memory map for data access at whatever address may be necessary in the corresponding system. In this exemplary embodiment, the address-mapped locations for internal RAM 36 during R/W mode are assumed without limitation to be locations 7D00H through 7DFFH.

The internal RAM 36 is in a code execution mode of operation when the memory control bit is a binary "1". During the code execution mode of operation, the RAM control logic circuit 42 provides an address select signal which causes address multiplexer 40 to connect the code address lines to the address input of the internal RAM 36. The RAM control logic circuit 42 also provides an output select signal which causes the data output multiplexer 54 to connect the code data output lines to the data output of the internal RAM 36. This output select signal also serves to disable the R/W data output buffer 52. The RAM control circuit 42 may utilize logic circuitry configured in a conventional manner to generate the appropriate select signals in response to the memory control bit. During the code execution mode, the internal RAM 36 is address-mapped from the above-noted R/W mode locations 7D00H through 7DFFH to locations 0000H through 00FFH.

The embedded microprocessor 20 may be designed to begin code execution at a particular address location in the internal RAM 36. For example, the 8051 microprocessor described above is typically configured to begin code execution automatically at location 0000H in the internal RAM 36 after system initialization. This may create a problem for conventional devices in the numerous applications in which the internal RAM 36 is not yet programmed with the desired code at system initialization. The present invention solves this problem by providing a forced jump instruction which directs the embedded microprocessor 20 to jump automatically to a predetermined external memory location and begin executing. The predetermined external memory location is specified by jump data stored in the forced jump data storage circuit 50 of FIG. 2. The externally-stored code includes instructions which direct the embedded microprocessor 20 to transfer code from the external memory 34 to the internal RAM 36. After this code transfer is complete, the internal RAM may be placed in a code execution mode such that the embedded microprocessor 20 can commence execution of the transferred code. The external memory 34 may then be reliably shared with other devices such as the host CPU 14. The present invention eliminates the possibility that the interrupt processing, power management or other functions of the embedded microprocessor 20 will be inadvertently disrupted by an inability of the embedded microprocessor 20 to access the external memory 34.

Figure 3:
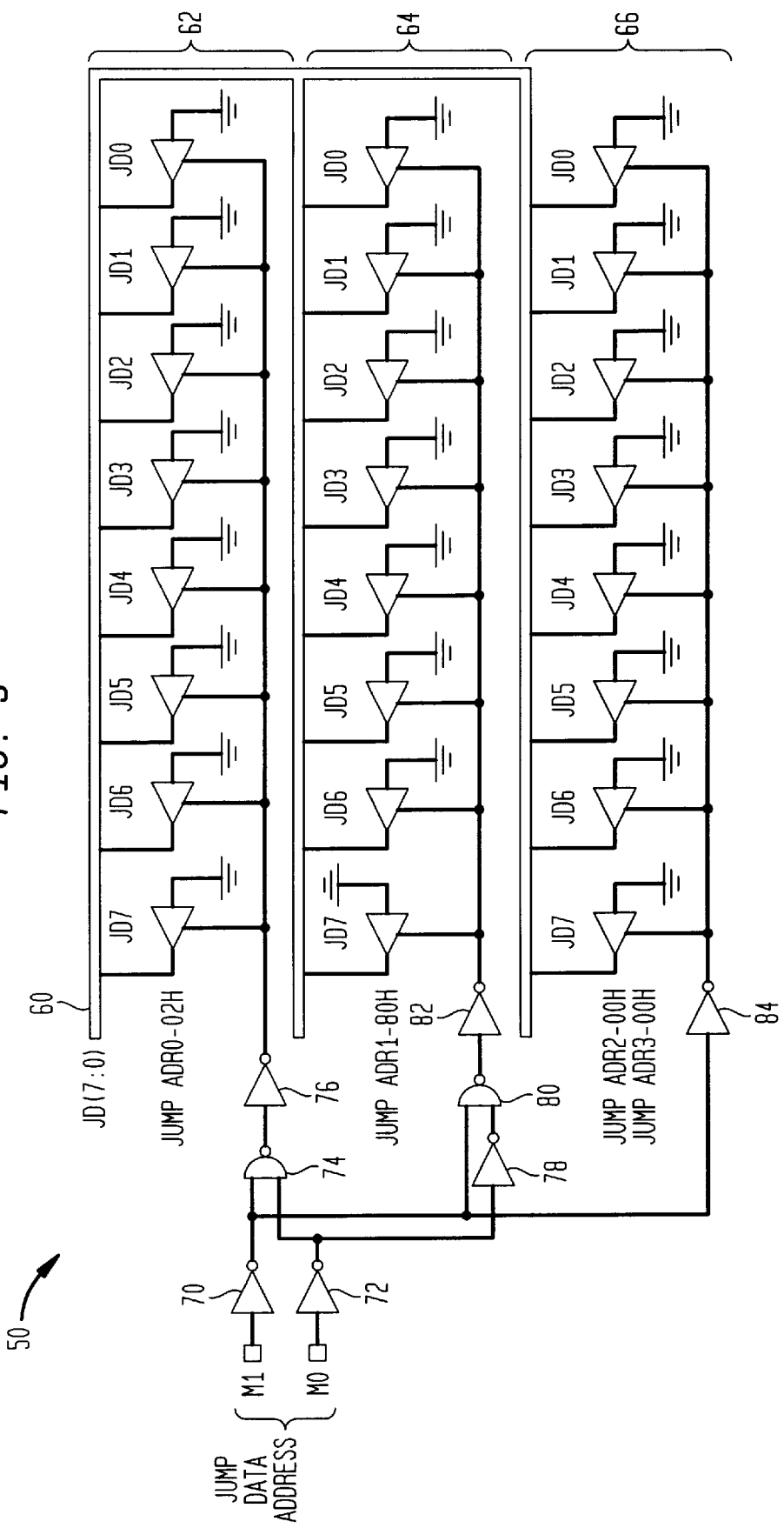
FIG. 3 is a schematic diagram of a forced jump data circuit suitable for use in the RAM multiplexing circuit of FIG. 2.

FIG. 3 is a schematic diagram of an exemplary jump data storage circuit 50 suitable for use in the RAM multiplexing circuit of FIG. 2. The circuit 50 includes a jump data bus 60 which includes signal lines for eight bits of jump data designated JD[7:0]. The circuit 50 also includes three sets of buffers 62, 64 and 66. The sets of buffers 62, 64 and 66 are hard-wired to store a set of jump data which forces the embedded microprocessor 20 to jump to a particular address in the external memory 34. The hard-wired storage is provided by connecting the inputs of the corresponding buffers to either ground potential or a positive voltage potential as shown in FIG. 3. The first, second and third sets of buffers 62, 64 and 66 in this example are hard-wired to store the values 02H, 80H and 00H, respectively. A particular one of the stored jump data values is selected in accordance with the values of the least significant code address bits M0 and M1. The second least significant bit M1 of the code address is applied via an inverter 70 to one input of a NAND gate 74 and to one input of a NAND gate 80. The least significant bit M0 of the code address is applied via an inverter 72 to another input of the NAND gate 74, and to an input of another inverter 78. The output of inverter 78 is applied to another input of the NAND gate 80. The outputs of the NAND gates 74, 80 are applied via inverters 76, 82 to the enable inputs of the first and second sets of buffers 62, 64, respectively. The output of the inverter 70 is also applied via an inverter 84 to the enable inputs of the third set of buffers 66.

The jump data applied to the jump data bus 60 is thus dependent upon the values of the least significant code address bits M0 and M1. The sequential application of the code address values 00B, 01B and 10B to the code address inputs of the jump data storage circuit 50 result in the sequential application of jump data 02H, 80H, and 00H to the jump data bus 60. As will be described below, this sequence of jump data provides a jump instruction code 028000H which directs the embedded microprocessor 20 to jump to location 8000H in external memory 34. Those of ordinary skill in the art will recognize that numerous alternative circuits may be utilized to provide this jump data storage function. In addition, it should be understood that the memory locations and instruction codes referred to herein are illustrative and will generally vary depending upon the particular microprocessor and memory implementations used in a given application.

Figure 4:
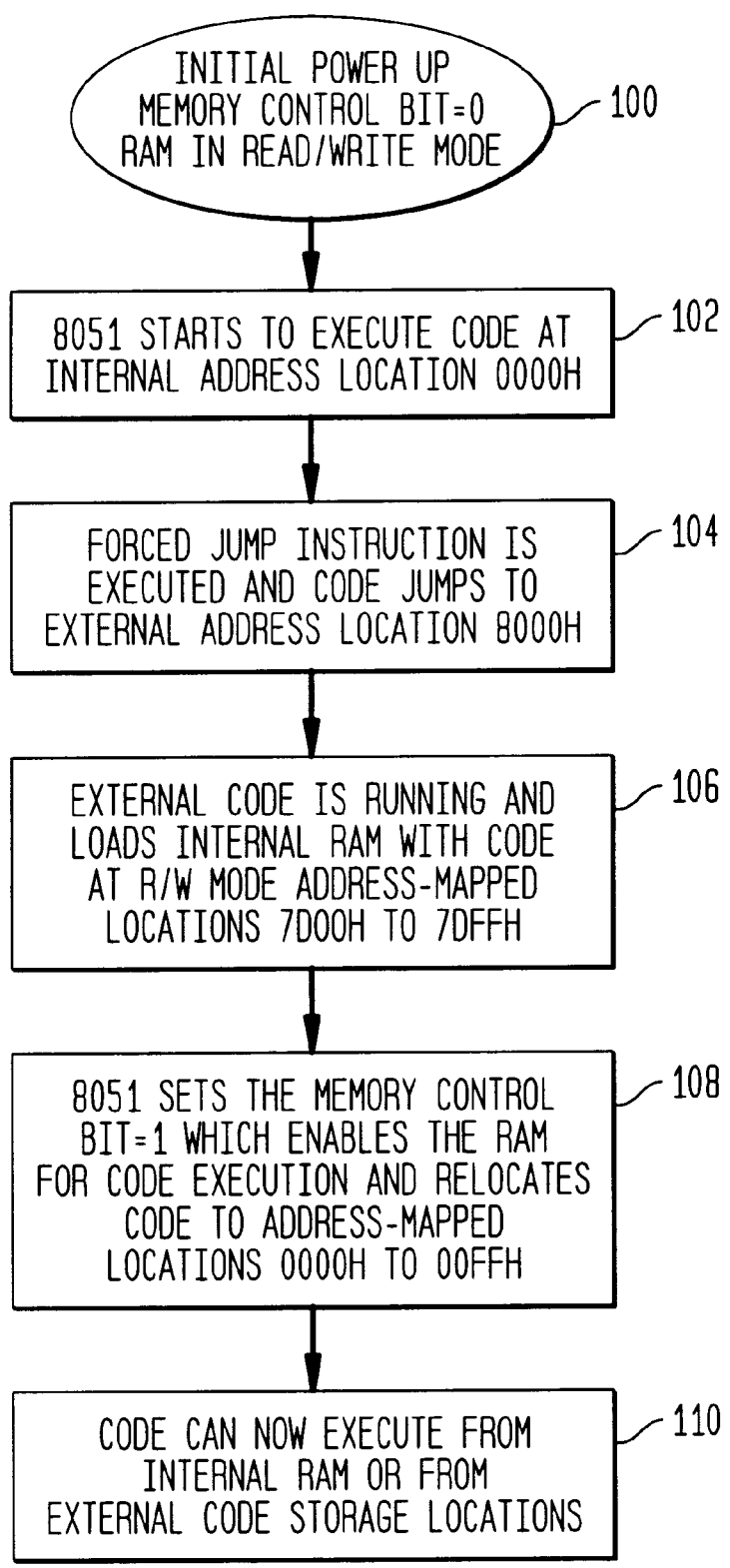
FIG. 4 is a flow diagram illustrating an exemplary relocatable code storage process in accordance with one embodiment of the present invention.

FIG. 4 is a flow diagram illustrating the operation of the RAM multiplexing circuit of FIG. 2. It will be assumed for purposes of this example that the embedded microprocessor 20 is an 8051 microprocessor which is hardware-coded to begin code execution automatically at location 0000H of the internal RAM 36. It will also be assumed that the internal RAM 36 does not include valid execution code at system initialization. Step 100 indicates that at an initial system power-up or other type of system initialization the memory control bit is set to a binary "0" and the RAM control logic circuit 42 places the internal RAM 36 into the above-described R/W mode by supplying appropriate select signals to the multiplexers 40 and 54. The setting of the memory control bit to a binary "0" at system initialization may be implemented via a default value stored in one of the control registers 18 of the multifunction controller 10. As noted above, the internal RAM 36 during R/W mode is address-mapped to locations 7D00H through 7DFFH.

The 8051 microprocessor in step 102 begins executing code from the internal RAM 36 beginning at location 0000H in accordance with the above-noted assumption. The 8051 microprocessor therefore provides sequential code addresses 0000H, 0001H and 0002H to the code address bus. The address multiplexer 40 of FIG. 2 is configured by the RAM control logic to prevent the application of these code addresses to the address inputs of the internal RAM. The forced jump data storage circuit 50 receives the code addresses from the 8051 microprocessor and generates therefrom the above-described jump instruction code 028000H. The data output multiplexer 54 of FIG. 2 is configured by the RAM control logic circuit 42 to pass the jump instruction code to the code data output and thereby to the 8051 microprocessor. The 8051 microprocessor then jumps to location 8000H in the external memory 34 and begins executing the external code at that location. Step 106 indicates that the code stored at location 8000H in external memory 34 includes a transfer instruction which directs the 8051 microprocessor to load the internal RAM 36 with 256 bytes of code from the external memory 34. The 256 bytes of code are loaded from the external memory into the above-noted R/W mode address-mapped locations 7D00H through 7pDFFH of internal RAM 36. A "transfer instruction" as the term is used herein may include a single instruction code, a set of codes or any other indication which directs the initiation of a data transfer. Alternative embodiments of the invention may combine the jump instruction and transfer instruction, such that the 8051 microprocessor automatically begins the data transfer from the address specified in the jump instruction or another specified address.

Step 108 indicates that after completion of the code transfer operation, the 8051 microprocessor sets the memory control bit to a binary "1". The RAM control logic circuit 42 responds by configuring the internal RAM 36 into the above-described code execution mode. This involves applying the appropriate select signals to the address multiplexer 40 and the data output multiplexer 54. The address multiplexer is configured to supply the code address bus lines to the address inputs of the internal RAM 36, and the data output multiplexer is configured to supply the code data output of the internal RAM 36 to the 8051 microprocessor. This automatically prevents the application of additional forced jump instruction data to the code data output bus lines. As noted above, the memory locations of internal RAM 36 in code execution mode are address-mapped from R/W mode locations 7D00H through 7DFFH to code execution mode locations 0000H through 00FFH. The 8051 microprocessor is then able to execute code from address-mapped locations OOOOH to OOFFH of the internal RAM 36, or from external code storage locations in external memory 34, as shown in step 110. The external memory 34 can now be shared reliably with other system elements such as host CPU 14 of FIG. 1 without interfering with the interrupt processing, power management or other functions of the embedded microprocessor.

The above-described relocatable code storage techniques ensure that the embedded microprocessor will have valid code stored in internal RAM after a system initialization. The interrupt service routines and other program code stored in the internal RAM can be efficiently updated or otherwise modified at system initialization. The relocatable code storage techniques may also be triggered in response to system events or operating conditions other than system initialization. For example, a reset of at least a portion of the system hardware could be used to trigger the forced jump instruction to thereby ensure that the embedded microprocessor has access to the shared external memory.

It should be understood that the foregoing description is merely illustrative of the invention. Numerous alternative embodiments within the scope of the appended claims will be apparent to those of ordinary skill in the art.

What is claimed is:

1. A method of storing code in an integrated circuit including an embedded microprocessor and an internal memory, the method comprising the steps of:

generating a jump instruction in response to a predetermined event, wherein the jump instruction directs the embedded microprocessor to jump to a designated location in an external memory;

executing a transfer instruction stored in the designated location in the external memory in response to the jump instruction; and initiating a transfer of code from the external memory to the internal memory in response to the transfer instruction, said transfer occurring to allocate memory resources within the integrated circuit to ensure performance of the integrated circuit during the predetermined event.

2. The method of claim 1 wherein the predetermined event is an initialization of a system in which the integrated circuit is installed.

3. The method of claim 1 wherein the predetermined event is a power-on reset of the integrated circuit.

4. The method of claim 1 wherein the step of generating a jump instruction in response to the predetermined event further includes the steps of:

applying a sequence of code addresses to a storage circuit including a plurality of sets of buffers, wherein each set of buffers stores a portion of a jump instruction code; and transmitting portions of the jump instruction code on a code data bus to the embedded microprocessor, wherein the portions are transmitted in a sequence corresponding to the sequence of code addresses.

5. The method of claim 1 further including the step of configuring the internal memory into a read/write mode in response to the predetermined event.

6. The method of claim 5 wherein the step of configuring the internal memory into a read/write mode in response to the predetermined event further includes the steps of:

generating an address select signal which is applied to an address multiplexer to select a read/write address input bus for connection to an address input of the internal memory; and generating a data output select signal which is applied to a data output multiplexer to select connection of jump instruction data to a code data output bus.

7. The method of claim 1 further including the step of configuring the internal memory into an execution mode after completing said transfer of code from the external memory to the internal memory.

8. The method of claim 7 wherein the step of configuring the internal memory into an execution mode after completing said transfer of code from the external memory to the internal memory further includes the steps of:

generating an address select signal which is applied to an address multiplexer to select a code address input bus for connection to an address input of the internal memory; and generating a data output select signal which is applied to a data output multiplexer to select connection of a data output of the internal memory to a code data output bus.

9. An apparatus for controlling code storage in an integrated circuit including an internal memory, the apparatus comprising:

an embedded microprocessor coupled to the internal memory and operative to interface with an external memory; and a multiplexing circuit coupled to the embedded microprocessor and the internal memory, wherein the multiplexing circuit in response to a predetermined event supplies a jump instruction to the embedded microprocessor which directs the embedded microprocessor to jump to a designated location in the external memory, wherein a transfer instruction stored in the designated location in the external memory is executed in response to the jump instruction, and wherein a transfer of code from the external memory to the internal memory is initiated in response to the transfer instruction, said transfer occurring to allocate memory resources within the integrated circuit to ensure performance of the integrated circuit during the predetermined event.

10. The apparatus of claim 9 wherein the predetermined event is an initialization of a system in which the integrated circuit is installed.

11. The apparatus of claim 9 wherein the predetermined event is a power-on reset of the integrated circuit.

12. The apparatus of claim 9 further including a jump data storage circuit comprising:

an input connected to receive a sequence of code addresses from the embedded microprocessor; and a plurality of sets of buffers coupled to the input, with each set of buffers storing a portion of a jump instruction code and enabled to generate an output in response to a particular code address;

wherein the multiplexing circuit is operative to supply the output of the jump data storage circuit to a code data bus coupled to the embedded microprocessor, such that portions of the jump instruction code are transmitted to the embedded microprocessor in a sequence corresponding to the sequence of code addresses.

13. The apparatus of claim 9 wherein the multiplexing circuit is further operative to configure the internal memory into a read/write mode in response to the predetermined event.

14. The apparatus of claim 13 wherein the multiplexing circuit further includes:

an address multiplexer;

a data output multiplexer; and a control logic circuit having outputs coupled to select signal inputs of the address and data output multiplexers, wherein the control logic circuit is operative to configure the internal memory into a read/write mode in response to the predetermined event by generating an address select signal which is applied to the address multiplexer to select a read/write address input bus for connection to an address input of the internal memory, and by generating a data output select signal which is applied to the data output multiplexer to select connection of jump instruction data to a code data output bus.

15. The apparatus of claim 9 wherein the multiplexing circuit is further operative to configure the internal memory into an execution mode after completion of said transfer of code from the external memory to the internal memory.

16. The apparatus of claim 15 wherein the multiplexing circuit further includes:

an address multiplexer;

a data output multiplexer; and a control logic circuit having outputs coupled to select signal inputs of the address and data output multiplexers, wherein the control logic circuit is operative to configure the internal memory into an execution mode after completion of said transfer of code from the external memory to the internal memory, by generating an address select signal which is applied to the address multiplexer to select a code address input bus for connection to an address input of the internal memory, and by generating a data output select signal which is applied to the data output multiplexer to select connection of a data output of the internal memory to a code data output bus.

17. A multifunction controller comprising:

an internal memory;

an embedded microprocessor coupled to the internal memory and operative to interface with an external memory; and a multiplexing circuit coupled to the embedded microprocessor and the internal memory, wherein the multiplexing circuit in response to a predetermined event supplies a jump instruction to the embedded microprocessor which directs the embedded microprocessor to jump to a designated location in the external memory, wherein a transfer instruction stored in the designated location in the external memory is executed in response to the jump instruction, and wherein a transfer of code from the external memory to the internal memory is initiated in response to the transfer instruction, said transfer occurring to allocate memory resources within the integrated circuit to ensure performance of the integrated circuit during the predetermined event.

* * * * *